(12) United States Patent
Hucker et al.

(10) Patent No.: US 9,129,744 B2
(45) Date of Patent: Sep. 8, 2015

(54) ELECTRICAL POWER SOURCES HAVING A COMPOSITE STRUCTURE INCLUDING HOLLOW FIBERS

(75) Inventors: Martyn John Hucker, North Somerset (GB); Sajad Haq, Glasgow (GB); Michael Dunleavy, Bristol (GB); Amy Elizabeth Dyke, Bristol (GB); Philip Lawrence Webberley, Preston (GB)

(73) Assignee: BAE SYSTEMS PLC, London (GB)

( * ) Notice: Subject to any disclaimer, the term of this patent is extended or adjusted under 35 U.S.C. 154(b) by 629 days.

(21) Appl. No.: 13/003,135

(22) PCT Filed: Jun. 25, 2009

(86) PCT No.: PCT/GB2009/050729
§ 371 (c)(1),
(2), (4) Date: Jan. 7, 2011

(87) PCT Pub. No.: WO2010/004313
PCT Pub. Date: Jan. 14, 2010

(65) Prior Publication Data
US 2011/0111266 A1    May 12, 2011

(30) Foreign Application Priority Data
Jul. 8, 2008    (GB) .................................. 0812486.9

(51) Int. Cl.
*H01M 2/38*    (2006.01)
*H01G 9/004*    (2006.01)
(Continued)

(52) U.S. Cl.
CPC ............... *H01G 9/004* (2013.01); *H01G 9/155* (2013.01); *H01G 11/40* (2013.01); *H01M 6/40* (2013.01); *H01M 8/1002* (2013.01); *H01M 8/1286* (2013.01); *H01M 8/241* (2013.01); *H01M 8/243* (2013.01); *H01M 10/0436* (2013.01);
(Continued)

(58) Field of Classification Search
CPC ........... H01M 2/36; H01M 6/02; H01M 6/24; H01M 10/02; H01M 10/04
USPC ..................... 429/72, 81, 122, 247
See application file for complete search history.

(56) References Cited

U.S. PATENT DOCUMENTS 3,979,222 A * 9/1976 Pompon .......................... 429/81
4,310,607 A * 1/1982 Shay .............................. 429/104
(Continued)

FOREIGN PATENT DOCUMENTS

DE    100 23 456 A1    2/2001
DE    102004062449    7/2006
(Continued)

OTHER PUBLICATIONS

International an International Preliminary Report on Patentability issued on Jan. 11, 2011, by British Patent Office as the International Searching Authority for International Application No. PCT/GB2009/050729.

(Continued)

*Primary Examiner* — Edu E Enin-Okut
(74) *Attorney, Agent, or Firm* — Maine Cernota & Rardin

(57) ABSTRACT

An electrical power source including at least one hollow fiber incorporated in a material structure, wherein the at least one hollow fiber forms part of an electric circuit capable of storing or generating electrical power. In this way power sources may be provided as an integral part of a fiber composite structure or fabric.

7 Claims, 8 Drawing Sheets

(51) Int. Cl.
  *H01G 9/00* (2006.01)
  *H01M 6/40* (2006.01)
  *H01M 8/10* (2006.01)
  *H01M 8/12* (2006.01)
  *H01M 8/24* (2006.01)
  *H01M 10/04* (2006.01)
  *H01M 14/00* (2006.01)
  *H01G 11/40* (2013.01)

(52) U.S. Cl.
  CPC .............. *H01M14/005* (2013.01); *Y02E 60/13* (2013.01); *Y02E 60/521* (2013.01); *Y02E 60/525* (2013.01); *Y10T 428/249921* (2015.04); *Y10T 428/2918* (2015.01); *Y10T 428/2975* (2015.01); *Y10T 442/3106* (2015.04); *Y10T 442/431* (2015.04); *Y10T 442/612* (2015.04)

(56) References Cited

U.S. PATENT DOCUMENTS

| | | | |
|---|---|---|---|
| 4,420,544 A | | 12/1983 | Lawson et al. |
| 4,788,114 A | | 11/1988 | Rothman |
| 5,518,836 A | * | 5/1996 | McCullough .................... 429/94 |
| 6,440,611 B1 | * | 8/2002 | MacFadden et al. ......... 429/247 |
| 6,667,099 B1 | | 12/2003 | Greiner et al. |
| 2004/0038117 A1 | * | 2/2004 | Tennison et al. ............... 429/44 |
| 2004/0142101 A1 | | 7/2004 | Eshraghi et al. |
| 2004/0175605 A1 | | 9/2004 | Eshraghi et al. |
| 2005/0271920 A1 | | 12/2005 | Eshraghi et al. |
| 2006/0154057 A1 | | 7/2006 | Nonninger |
| 2008/0124597 A1 | | 5/2008 | Murata et al. |
| 2009/0220842 A1 | | 9/2009 | Zaopo et al. |

FOREIGN PATENT DOCUMENTS

| | | | | |
|---|---|---|---|---|
| EP | 723307 A1 | * | 7/1996 | .............. H01M 4/74 |
| JP | 05336676 A | * | 12/1993 | ................ H01J 7/02 |
| JP | 2008010205 | | 1/2008 | |
| JP | 2011000529 | | 1/2011 | |
| WO | WO 02/15308 A2 | | 2/2002 | |
| WO | WO03015207 | | 2/2003 | |
| WO | WO 2007/011206 A1 | | 1/2007 | |
| WO | WO2007103422 | | 9/2007 | |
| WO | WO 2007/128330 A1 | | 11/2007 | |

OTHER PUBLICATIONS

Written Opinion (PCT/ISA/237) issued on Jan. 4, 2009, by British Patent Office as the International Searching Authority for International Application No. PCT/GB2009/050729.

GB Search Report dated Dec. 9, 2008, 2 pages.

International Search Report (PCT/ISA/210) issued on Nov. 4, 2009, by United Kingdom Patent Office as the International Searching Authority for International Application No. PCT/GB2009/050729.

United Kingdom Search Report issued on Dec. 10, 2008.

Pedro Nehter, "Two-Dimensional Transient Model of a Cascaded Micro-Tubular Solid Oxide Fuel Cell Fed With Methane", Journal of Power Sources, vol. 157, No. 1, Jul. 19, 2006, pp. 325-334, XP025084037.

* cited by examiner

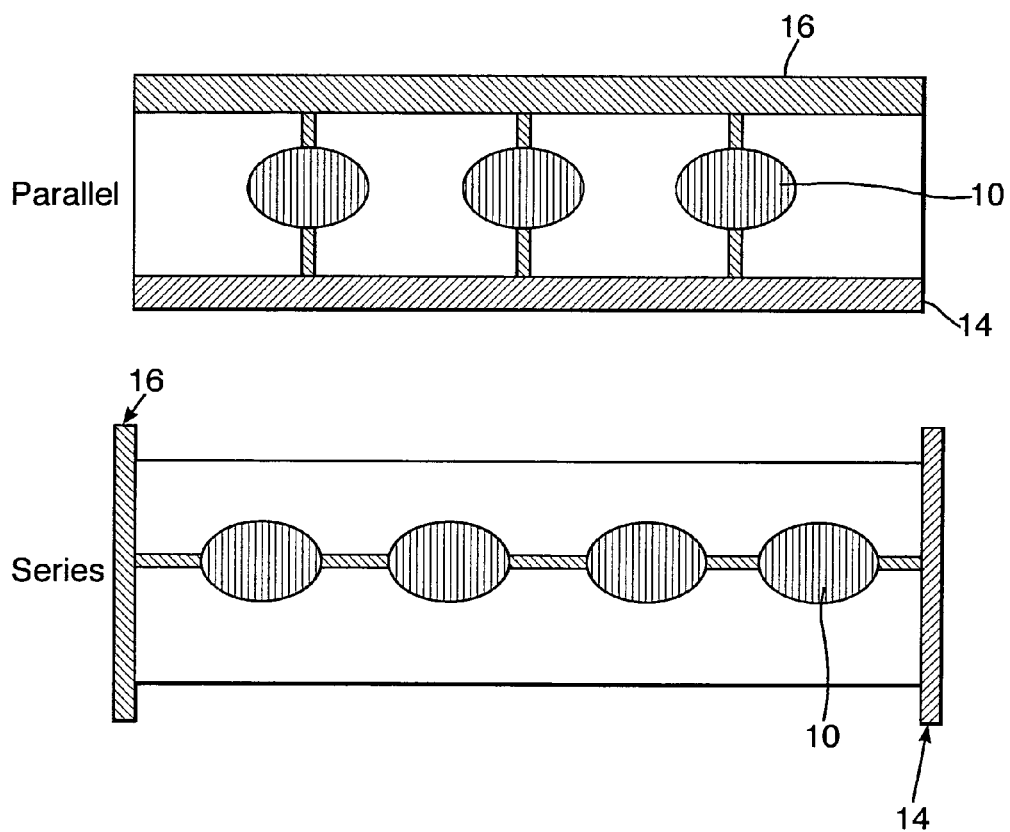

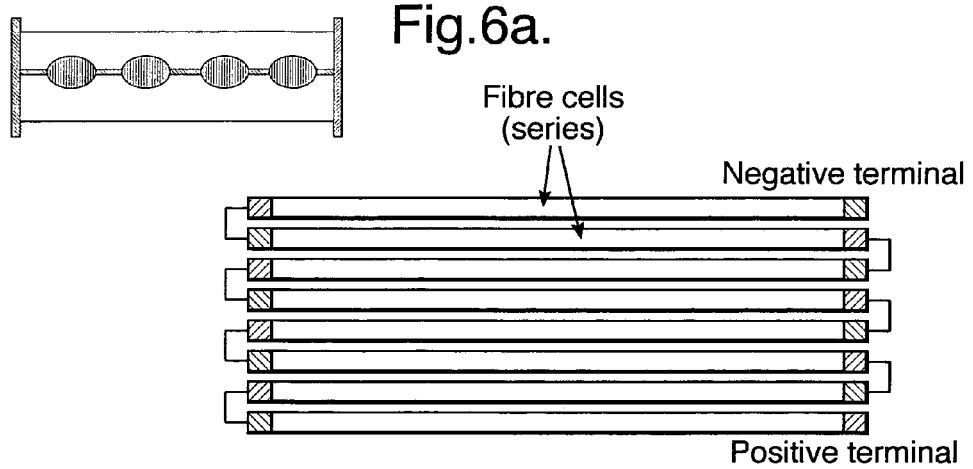
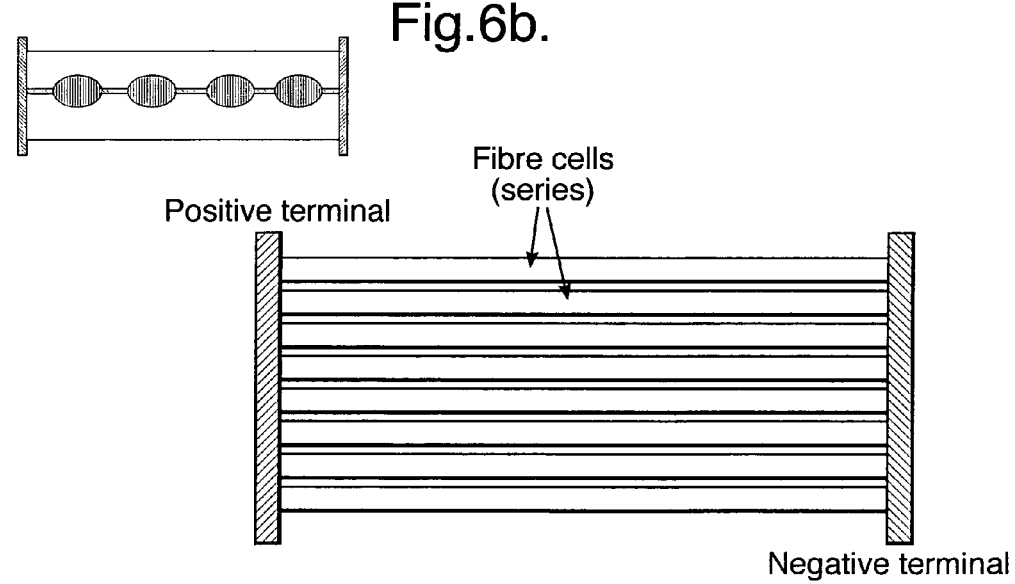

Key
- Transparent Substrate
- Sensitiser Coated Colloidal TiO$_2$
- Electrode Coating (ITO, Carbon)
- Metal Contacts
- Liquid Electrolyte Solar Illumination External Load or Current Measurement

ELECTRICAL POWER SOURCES HAVING A COMPOSITE STRUCTURE INCLUDING HOLLOW FIBERS

This invention relates to electrical power sources and in particular, but not exclusively, to power sources that are integral with a structure or other material.

There are many instances where a vehicle requires a power source to generate or store electrical power for control or operation of the device. Typically such electrical power sources take the form of conventional battery packs that are disposed within the vehicle. Such electrical power sources occupy space and contribute to the weight of the vehicle. Also the electrical power sources can often be some way away from where the power is to be delivered, therefore requiring cabling to connect the power source with both the circuit to which it is to be connected as well as any charging circuit. The remote nature of such power sources can also be problematic if the structure is partially damaged.

We have developed and disclosed in earlier pending patent applications new techniques for integrating into fibre composite materials detectors and shielding arrangements for providing vehicle components to detect the incidence of harmful electromagnetic radiation (e.g. nuclear radiation) and to provide active shielding from such radiation. In this way a component such as a skin element of a vehicle can be produced that has a special capability integrated therein. Similar technology has also been developed using fibre reinforced material to enable the radar cross section of a vehicle or object to be considerably reduced using actively modifiable materials within some of the fibres making up a surface or layer in a vehicle or other object. This surface or layer may also have important structural, aerodynamic or shielding properties. Such equipment and also other such technologies under development require electrical power and it is desirable to provide a power source that can be integrated into the fibre reinforced material along with the active elements in the composite material making up e.g. the detection and shielding functions. There is therefore a need to provide composite materials that have a power source integrated therein and which can supply electrical power to electrical circuits integrated into the same material or to other components that may be remote from the power source.

Likewise there is a need to provide a suitable power source in fabrics and materials made of an agglomeration of fibres for use in a wide range of applications including for example being laid up as a reinforcement mat in a fibre composite material or for other applications such as shielding, clothing etc.

We have designed a power source that may be integrated into the fibres making up a fibre composite structure or other material along with other active functionality if required.

Accordingly, in one aspect, this invention provides an electrical power source comprising at least one hollow fibre incorporated into a material structure, wherein said at least one elongate hollow fibre forms part of an electric circuit or component capable of storing or generating electrical power.

Preferably said elongate hollow fibres are contained in a matrix material thereby to provide a fibre reinforced material. In this manner a fibre composite material may be provided with an integral power source. The matrix material may conveniently comprise a polymeric, elastomeric, metal, or ceramics material or any other suitable matrix material, or mixtures of the aforesaid.

Alternatively or additionally the elongate hollow fibres may be woven knitted, spun filament wound or matted to form a material comprising an agglomeration of said elongate hollow fibres. The fibres may make up a relatively rigid structure or they may define a flexible or drapable structure, cloth or material.

The elongate hollow fibres may be made of any suitable material including those already used for fibre reinforcement, for example a material selected from the group comprising carbon fibres, glass fibres, mineral fibres, ceramic fibres, polymeric fibres, and metal fibres.

Many different types of power source are envisaged; in one embodiment said elongate hollow fibres form an active or passive component of an electrochemical cell. Thus said elongate hollow fibres may contain an electrolyte forming part of said electrochemical cell. In one arrangement, the fibres contain an electrolyte and act as an ion bridge between two electrolyte compartments containing respective electrodes. Alternatively the matrix material in which the fibres are contained may be an ionic conductive polymer which acts as the electrolyte in the cell. The elongate hollow fibres may have coated or deposited thereon spaced electrode regions, or be otherwise treated to render selected parts thereof electrically conducting to serve as an electrode region. The electrode regions may be provided on opposite internal wall regions of said elongate hollow fibres. Alternatively or additionally said spaced electrode regions may be disposed concentrically with respect to said elongate hollow fibres, and spaced from each other by e.g. a polymer material. In another arrangement, the electrodes may be spaced periodically along the length of the fibre.

The or each elongate fibre may contain a plurality of electrochemical cells disposed along the length of the fibre. Each of the electrochemical cells in a fibre may be connected in parallel between a positive and a negative terminal. Alternatively each of the cells in a fibre may be connected in series between a positive and a negative terminal.

Said elongate hollow fibres may form part of an electrochemical cell making up a secondary battery and said power source further may include means for charging said secondary battery.

In another form of power source, at least some of said elongate hollow fibres form part of a fuel cell. Thus the elongate hollow fibres may contain a plurality of fuel cells disposed along their length. Each of said fuel cells in a fibre may be connected in parallel between a positive and a negative terminal. Alternatively each of the fuel cells in a fibre may be connected in series between a positive and a negative terminal.

In another form of power source, at least some of said elongate hollow fibres form part of a photovoltaic cell. Thus the elongate hollow fibres may contain a plurality of photovoltaic cells disposed along their length. Each of said photovoltaic cells in a fibre may be connected in parallel between a positive and a negative terminal. Alternatively each of the photovoltaic cells in a fibre may be connected in series between a positive and a negative terminal.

In yet another form of power source at least some of said elongate hollow fibres form part of a capacitor. Thus the hollow fibres may include spaced electrodes with a suitable dielectric therebetween. The electrode configurations for this capacitative power source may be similar to those used in the electrochemical cells. Numerous configurations are possible for example, on a single hollow fibre, spaced electrodes could be deposited on the inner and outer surfaces of the hollow fibre respectively. Alternatively the inner (and/or outer) surface may have deposited thereon in succession a first electrode layer, a dielectric layer, and a second electrode layer.

In another scheme, the fibres may be packed in a generally uniform array and each provided with an electrically conducting core serving as an electrode, so that the fibre material and the fibre matrix material both serve as dielectrics. Alternate layers may be interconnected to give an interdigitated capacitive structure.

Various options are available for the connections between fibres; thus at least some of the elongate hollow fibres that form part of the electrical circuit capable of storing or generating power may be connected with their positive and negative terminals in parallel. Alternatively or additionally at least some of the elongate hollow fibres that form part of the electrical circuit capable of storing or generating power may be connected with their positive and negative terminals in series.

The invention extends to a land, air, space or water vehicle comprising a skin element incorporating an electrical power source as described above, and to a flexible material or garment incorporating an electrical power source as described above.

Whilst the invention has been described above, it extends to any inventive combination or sub-combination of the features set out above or in the following description or claims.

The invention may be performed in various ways and, by way of example only, various embodiments thereof will now described in detail, reference being made to the following drawings, in which FIG. 1 is a schematic of the construction of a basic electrochemical cell;

Figure 7:
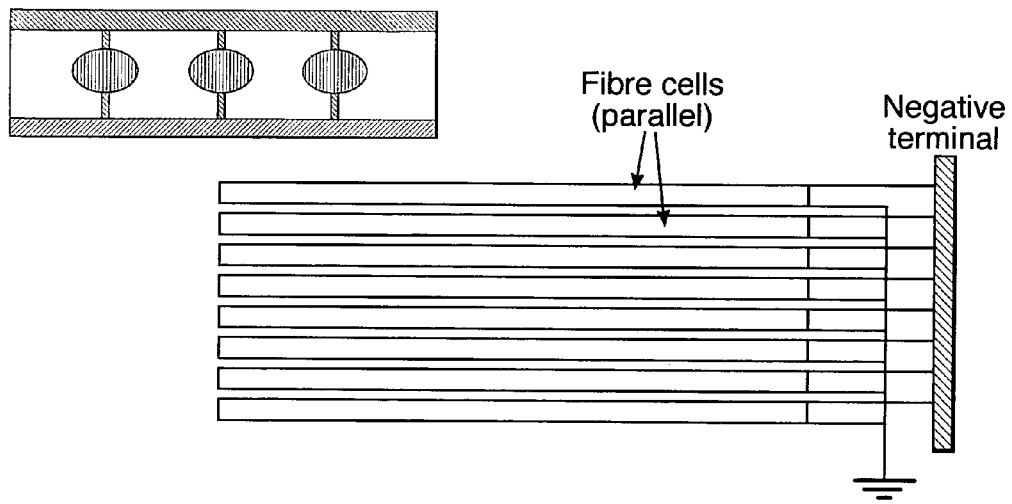
Figure 8:
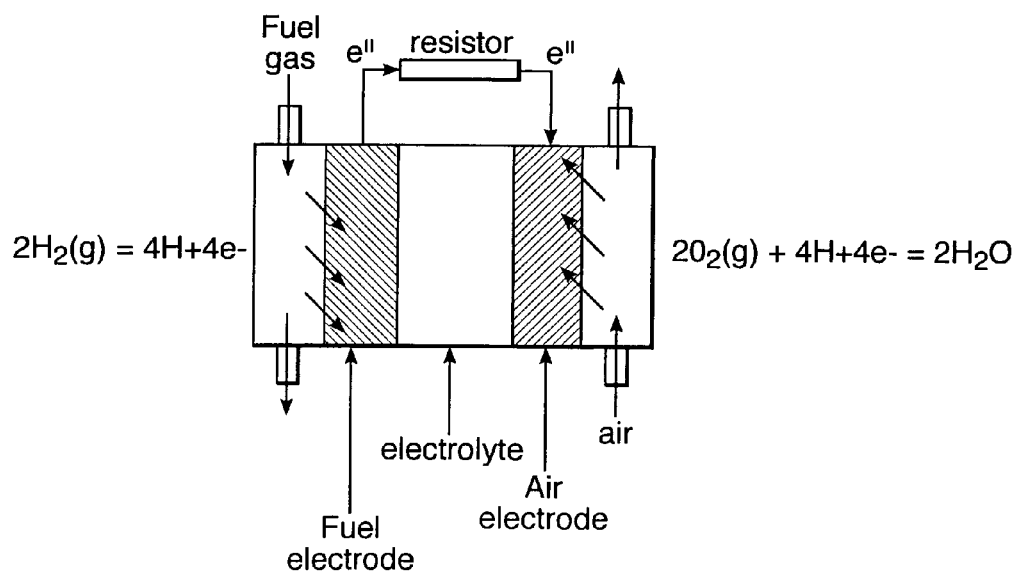
Figure 9:
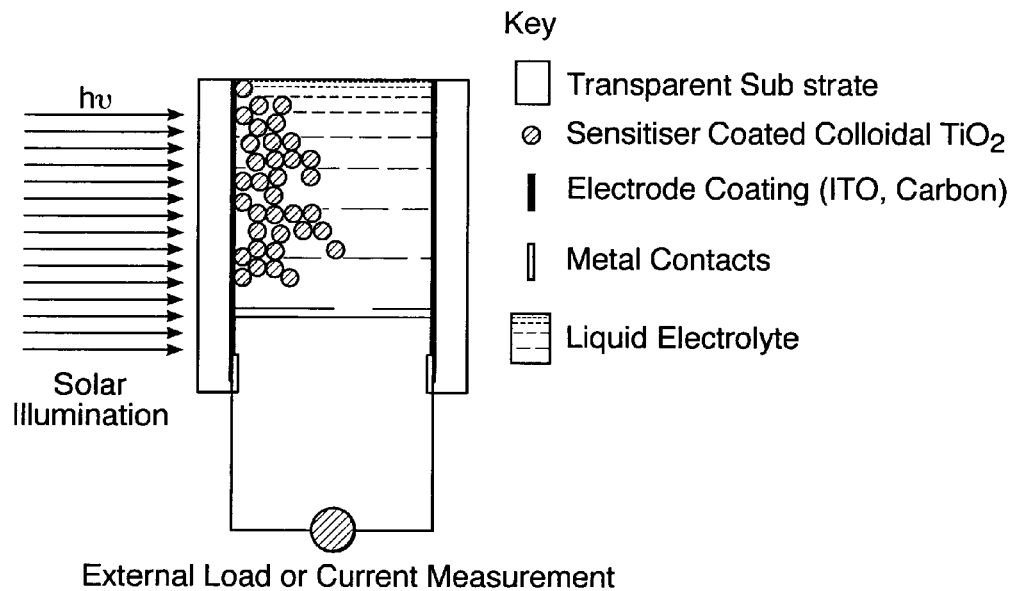
Figure 10:
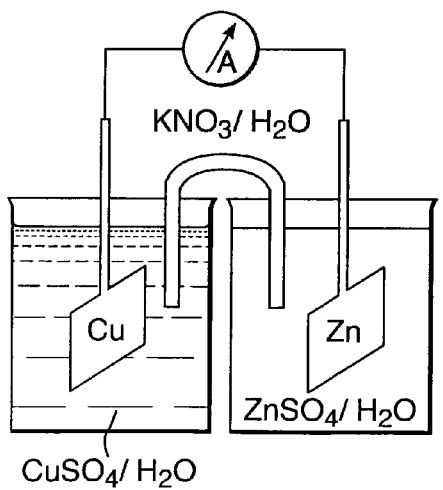
Figure 12:
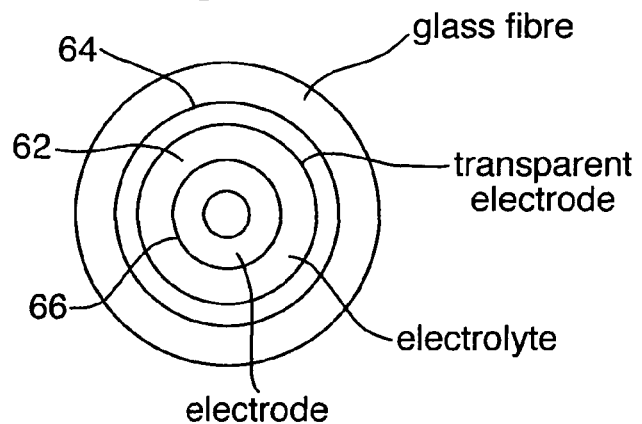
Figure 13:
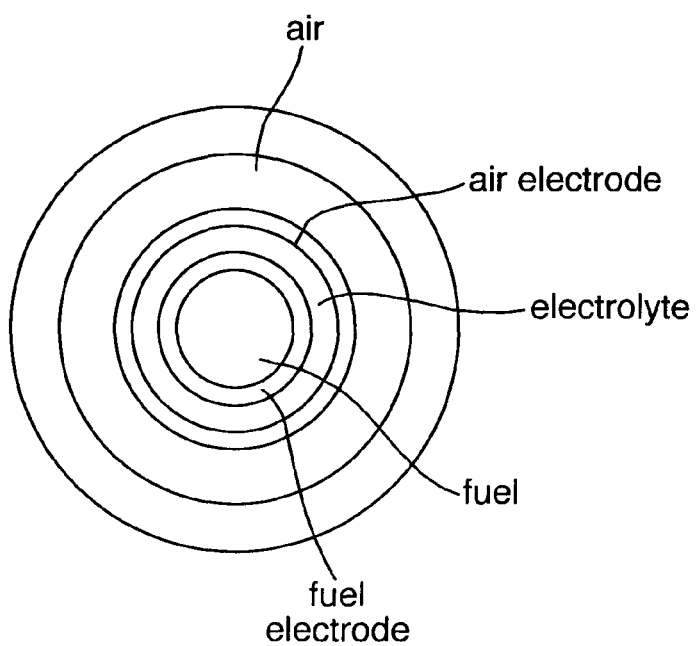

FIGS. 4 (a) and (b) show two different options for metallisation within a fibre to provide an electrode structure;

FIG. 5 shows schematically parallel and series groupings of power source cells within a fibre;

FIGS. 6(a) and (b) show schematically fibres containing series connected power source cells, connected in series and parallel respectively;

FIG. 7 shows schematically fibres containing parallel connected power source cells, connected in parallel;

FIG. 8 shows the basic construction of a power source in the form of a fuel cell;

FIG. 9 is a schematic view of a Gratzel cell;

FIG. 10 is a schematic of a battery structure using a hollow fibre containing an ion bridge;

FIGS. 11 (a) and (b) are schematic section and plan views respectively of an electrochemical cell arrangement in accordance with the invention;

FIG. 12 is a schematic view of a Gratzel cell arrangement in accordance with the invention, and FIG. 13 is a schematic view of a fuel cell arrangement in accordance with the invention.

The embodiments comprise power sources that are incorporated into small hollow fibres that also provide important, if not principal, material properties of the structure, whether that be a fibre reinforced plastics composite material, or flexible mat or weave of fibrous material.

Various types of power source may be used, including batteries, fuel cells, light harvesting sources such as solar cells, power sources that exploit thermoelectric effects, power sources that rely on conversion of acoustic energy, mechanical devices based on magnetic coupling or piezoelectric effects for example, as well as nuclear power sources. Furthermore the power source may be one or more capacitors that can store electric charge In the embodiments below, we give examples of specific technologies.

Batteries

Figure 1:
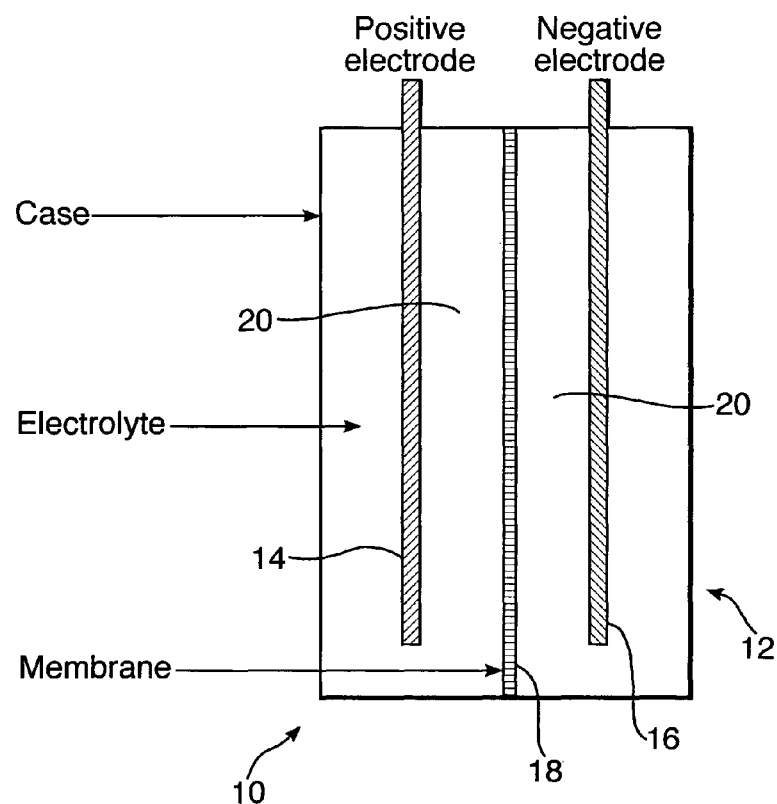

FIG. 1 shows a schematic of the construction of a basic electrochemical cell 10. It consists of five elements, the case 12 which forms the outer container and holds the active materials, two electrodes 14,16 a membrane 18 separating the two electrodes and an electrolyte 20. The different types of batteries available include zinc-carbon: alkaline; lithium, lithium-iodide and lead-iodide chemistry batteries; lead-acid; nickel-cadmium; nickel-metal hydride; lithium-ion; zinc-air; zinc-mercury oxide; silver-zinc; and metal-chloride. Some of the above are primary batteries (single use, disposable) and others secondary (rechargeable) batteries.

A variety of materials and chemicals are used in modern rechargeable battery arrangements. The electrodes are metals, oxides, alloys or carbon based, for example lead/lead oxide, cadmium/nickel oxide, nickel oxide/metal hydride (complex alloys of lanthanides/Ni or Ti/Zr), LiCoO2/graphite, fluorinated graphite. The electrolytes are usually of liquids, gels or even pastes, such as sulphuric acid, potassium hydroxide, lithium salts in organic solvents, and Polymer electrolytes (gels). The membrane can be a porous ceramic or polymer selected from e.g. porous ionic ceramics, polymer electrolytes and permeable polymers. The cases can be made of steel, plastic and even glass has been used.

Figure 2:
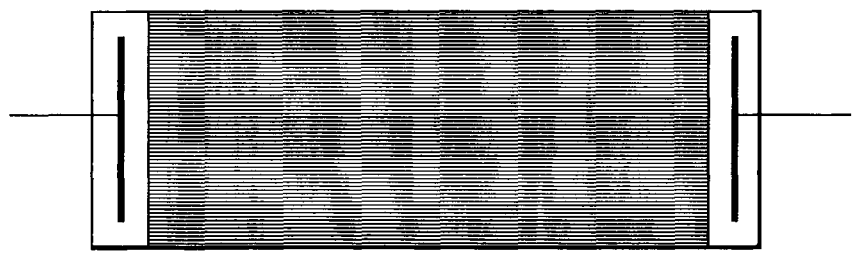
FIG. 2 is a schematic view of a composite fibre power source in accordance with this invention.

FIG. 2 shows a specific example of a battery in which a section of structural fibre reinforced polymeric material 50 comprises hollow reinforcement fibres 52 that contain an electrode (here $KNO_3$) that acts as an ion bridge between spaced electrolyte compartments 54, 56 containing suitable electrolytes (here $CuSO_4$, $ZnSO_4$ respectively) for two electrodes 58, 60 of copper and zinc respectively. In this arrangement the fibres themselves do not need to be provided with electrodes because they simply serve as hollow ion bridges between the electrolyte compartments.

Many other electrochemical arrangements are possible. For example a hollow fibre may be plated internally at one end with nickel and at the other end with iron, with the remainder of the core of the fibre of being filled with KOH, to provide a robust rechargeable battery.

Figure 3:
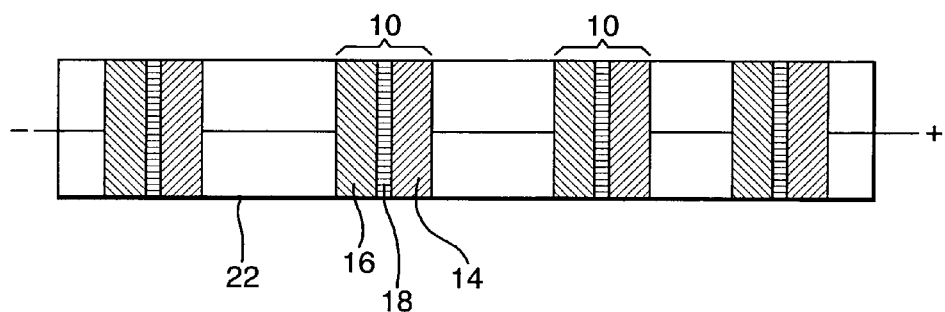
FIG. 3 is a schematic of a series of cells formed in a hollow fibre in accordance with this invention.

FIG. 3 shows a schematic of how a typical battery, (in this case a lead acid battery), may be connected in series to form a linear arrangement and implemented within a hollow fibre 22 acting as the casing. It will be seen that this is made up of a series of cells 10 each comprising the basic components of the cell described above, namely a casing 22/12, an electrolyte 20, electrodes 14,16, and a membrane 18. The cells are connected in series by a conductor 24 connecting each opposed pair of electrodes 14,16. The conductor may be formed by metallising the inner surface of the hollow fibre 22.

The constituent materials are metals (two different types of metals are required for the anode 14 and cathode 16), an electrolyte 20, which may be a liquid or a gel, a barrier material or membrane 18 between the anode and cathode (such as a polymer) and some form of metallisation or conductive pathway for the interconnection.

Figure 4A:
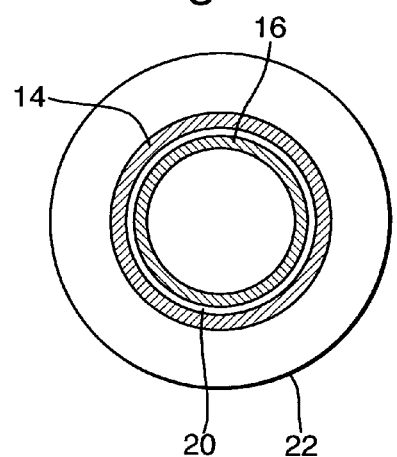

The electrodes have to be separated within the fibre, and suitable materials include ion permeable materials, such as porous ceramics, polymer or gels. Alternative strategies for electrode placement may be employed, such as for example concentric electrodes 14,16 consisting of metallisation on the internal fibre walls sandwiched with a polymeric material (FIG. 4(a)), or a linear arrangement of anode 16 and cathode 18 spatially separated from each other by deposition of each on opposing regions of fibre 22 (FIG. 4(b)) or even along the fibre length. FIGS. 4(a) and (b) are electrode arrangements in fibre bore viewed looking down the fibre axis; (a) shows a polymer electrolyte 20 sandwiched between electrodes 14, 16 and (b) shows facing electrodes 14,16 with electrolyte 20 in the fibre bore.

Location of materials laterally (along the fibre length) within the fibre can be achieved using a variety of strategies. Techniques such as positional control of reactants, co-displacement of reagents, reactant site inhibition and selective deposition may all be used. For example discretised growth of metal at selected areas on the internal fibre bore surfaces may be used. Material incorporation vertically, i.e. fibre wall to fibre wall can be undertaken by multilayering methods, for example metallisation of internal walls of fibres, their subsequent overcoating with a polymeric material, followed by incorporation of electrolytic fluid. Interconnection of cells within the fibre may be achieved using various methods including introduction of a conductive medium within the fibre, or selective deposition within the fibres.

Within a fibre or a fibre composite any materials forming a cell are grouped to obtain a practically functioning structure with useful voltage or current output. This is equally applicable for any of the power generation methods identified above and hence the power generation element is considered purely as a generic element at this stage. FIG. 5 shows how a group of any such power elements can be arranged within a fibre. The figure shows both a parallel and a series arrangement.

Furthermore the connections between fibres may be series, parallel or both. FIGS. 6(a) and 6(b) show how a series arrangement of power cells in a fibre may be connected together in both a serial arrangement (FIG. 6(a)) and a parallel arrangement (FIG. 6(b)).

FIG. 7 shows an arrangement of fibres each containing a plurality of power cells connected in parallel, with the fibres themselves then also being connected in parallel.

Capacitors

As a variant on the arrangement of FIG. 4(a) a capacitor may be constructed in a similar manner by depositing the first electrode on the inner surface of the fibre and then a dielectric laid on to the first electrode with a second electrode being deposited on the dielectric. This gives a structure of two concentric electrodes disposed within the bore of the fibre, and sandwiched to either side of a cylindrical element of dielectric material. Other configurations such as that shown in FIG. 4(b) may be used, but with dielectric in place of the electrolyte.

Fuel Cells

Fuel cells are electrochemical cells but in contrast to batteries rely upon the continuous flow of chemicals into the cell. A schematic of the major constituents of a fuel cell is shown in FIG. 8, and shows the anode 30, cathode 32 and the electrolyte 34 separating the electrodes. Hydrogen is the most common of the fuels used and flows in to the anode and dissociates into hydrogen ions and electrons. The protons travel through the electrolyte whilst the electrons flow around the external circuit, thus supplying power. The hydrogen ions diffuse through the electrolyte, which may for example be a polymer film, and combine with the oxygen and electrons to produce the water as the waste product.

Table 1 below summarises the different materials that are used for fuel cell technology. Several types of electrolytes, liquid or solid may be used such as for example potassium hydroxide, ceramics or a proton conducting polymer membrane. The electrodes can be made of conducting materials, e.g. metals, nanotubes, etc and are usually coated with a catalyst such as platinum to increase the reaction efficiency. Alternatives to hydrogen fuels are also employed, e.g. alcohols or other hydrocarbons, but these are then processed using a reformer which generates hydrogen from the fuel.

TABLE 1

Main Types of Fuel Cell

| Type | Electrolyte | T Range/C. | Catalyst |
|---|---|---|---|
| Alkaline | KOH | 50-150 | nickel positive |
| Phosphoric | $H_3PO_4$ | 200 | Pt on C |
| PEM | polymer | 100 | Pt on C |
| Carbonate | $Li_2CO_3$ | 650 | $Li_2O/NiO$ |
| Solid Oxide | Yttria/zirconia | 700-1000 | Lanthanides |

Photovoltaic Sources

Photovoltaic energy is a major potential renewable fuel source. Solar cells technology is dominated currently by silicon based materials but these are difficult to manufacture and are expensive. Gratzel cells are currently being developed as they could provide a low cost alternative to silicon cells and display similar efficiencies to silicon under direct lighting conditions and improved efficiencies under low light conditions.

Gratzel cells consist of liquid electrolytes containing a dye sensitised material to absorb incident radiation. FIG. 9 shows a schematic of Gratzel cell which uses a titania (TiO2) colloid 62 coated with a sensitiser dye. Incident light passes through the transparent conductive coating 64 (eg Indium Tin Oxide) of the cell and is absorbed by the sensitiser/titania colloid. Photoelectrons are generated, accumulate at the negative electrode 66 then flow through the external circuit. The liquid electrolyte, which may be an iodide for example, completes the circuit and the sensitiser is reduced to its original state.

Figure 4B:
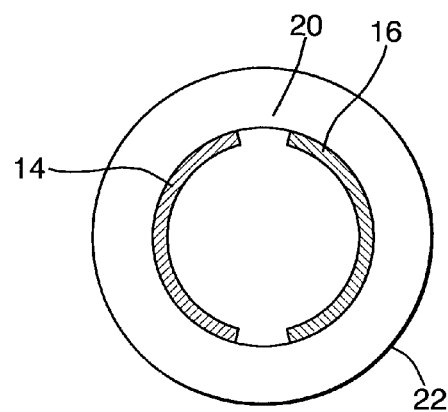

Thus a power source may provided by plating transparent electrodes on the surfaces of a fibre in a manner similar to that shown in the configuration of FIG. 4(b) and the bore of the fibre is filled with an electrolyte containing r coated colloidal titania as sensitiser.

Example 1

A structure as pictured in FIG. 10 was constructed. It consists of two electrodes, Cu and Zn, immersed in aqueous copper sulphate and aqueous zinc sulphate respectively and connected together with potassium nitrate electrolytic gel incorporated within a 6 mm tube 40. All reagents including the gel were prepared in our laboratories. When the electrodes were connected through a multimeter a voltage of around 1.7V was measured. The tubing was replaced with successively smaller diameter materials to internal diameters of 1 mm. These structures provided voltages of around 1.5 V. The length of the tubes was several centimeters, typically around 15 cm.

With further experimentation and revaluation of the chemistry of the gel/electrolyte combination and development of filling methods manufactured structures were manufactured with an internal diameter of 47 microns. A voltage between 0.2 and 0.8 volts was obtained with 47 micron internal diameter fibres. The data is tabulated below in TABLE 2.

| Diameter (mm) | | |
|---|---|---|
| Diameter (mm) | Length (cm) | Voltage (V) |
| 0.40 | 7.3 | 1.5 |
| 0.25 | 7.5 | 1.5 |
| 0.30 | 5.0 | 0.9 |

-continued

| Diameter (mm) | Length (cm) | Voltage (V) |
| --- | --- | --- |
| 0.25 | 4.0 | 1.0 |
| 1.00 | 20.0 | 0.8-0.9 |
| 0.047 | 2.0 | 0.2 |
| 0.047 | 2.5 | 0.2 |
| 0.047 | 1.0 | 0.8 |
| 0.047 | 5.5 | 0.4 |
| 0.047 | 3.0 | 0.5 |
| 0.047 | 5.0 | 0.6 |

With all of the technologies described above a hollow fibre is adapted so that it is capable of delivering electrical power across its ends. We have disclosed connection methods for connecting together fibres is series, parallel or hybrid arrangements. The fibres may then be formed into composite fibre components using existing techniques. Thus the fibres may be assembled in woven/non-woven mats which are pre-impregnated with a curable plastic material. Alternatively the fibres or mats may be laid in a mould which is then filled with a curable plastics material. Still further the fibres may be made up into a flexible fabric material that has the ability to deliver electrical power.

Figure 11A:
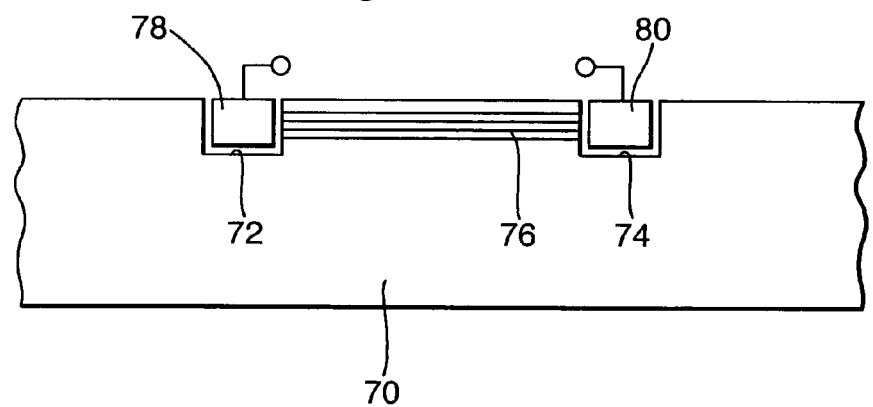
Figure 11B:
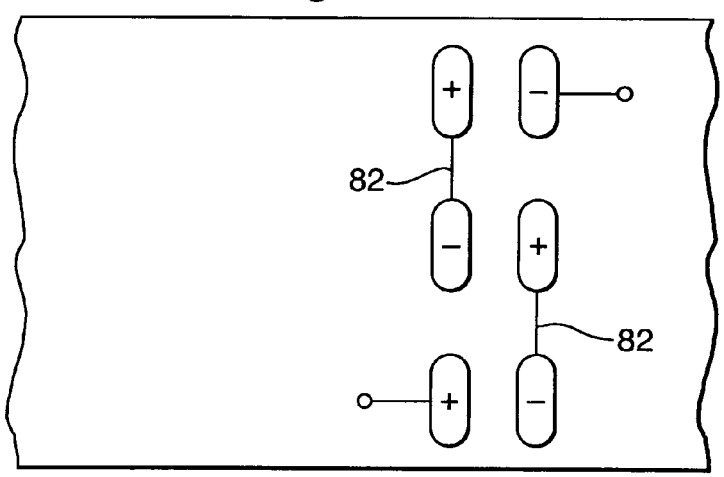

Referring now to FIGS. 11(a) and 11(b), in another arrangement an electrochemical cell is made up by providing a composite structure in the form of a sheet of composite material 70 which has two wells 72, 74 formed in it. Extending between the wells, and in flow communication with each, are a number of hollow fibres 76 each containing an electrolyte. The electrolyte may typically comprises an aqueous solution or gel potassium hydroxide which acts as an ion bridge between the wells. Each of the wells is fitted with a suitable metal electrodes 78, 80 for example nickel in one and iron in the other, or Nickel in one and cadmium in the other. There are of course numerous other suitable materials. The metal electrodes in combination with the ion bridge make up an electrochemical cell.

In other examples, the wells could contain respective electrolytes such as copper sulphate and zinc sulphate and, in contact therewith, respective metal electrodes of copper and zinc. The electrochemical cell so formed may be interconnected in parallel or serious as required. The interconnects may be in the form of conducting tracks on the surface of the composite material but it is particularly preferred for the connections to be made by means of electrically conducting fibres 82 embedded in the matrix material, for example carbon or other electrically conducting fibres. These fibres may conveniently also serve a fibre reinforcing function to the matrix material.

FIG. 12 shows the components of a Gratzel cell disposed within a fibre in accordance with the invention. FIG. 13 shows the components of a fuel cell disposed within a fibre in accordance with the invention.

It will be appreciated that the apparatus and methods described herein may be used with other techniques in which a composite fibre structure is configured to perform functions other than purely structural. For example the apparatus and methods herein may be combined with other techniques to make up intelligent structures capable of e.g. shielding and detection of radiation and/or structures capable with a facility the structural health monitoring and/or self repair.

The invention claimed is:

1. An electrical power source comprising:
at least one hollow fibre incorporated in a material structure, wherein said at least one hollow fibre forms part of an electric circuit for storing or generating electrical power, wherein the at least one hollow fibre contains a first electrolyte and via the first electrolyte acts as an ion bridge between two compartments both including a second electrolyte and electrode, respectively.

2. An electrical power source according to claim 1, wherein said at least one hollow fibre is elongate and contained in a matrix of a material to provide a fibre reinforced material.

3. An electrical power source according to claim 1, wherein said at least one hollow fibre is elongate and made of a material selected from the group consisting of carbon fibres, glass fibres, mineral fibres, ceramic fibres, polymeric fibres, and metal fibres.

4. An electrical power source according to claim 1, wherein said at least one hollow fibre is elongate and woven, knitted, spun filament wound or matted to form a material comprising an agglomeration of said elongate hollow fibres.

5. An electrical power source according to claim 1, wherein said at least one hollow fibre is elongate and forms part of an electrochemical cell making up a secondary battery and said power source further comprises:
means for charging said secondary battery.

6. A vehicle comprising:
a skin element incorporating an electrical power source according to claim 1.

7. A garment comprising:
an electrical power source as claimed in claim 1.

* * * * *